US008619984B2

(12) United States Patent
McSherry et al.

(10) Patent No.: US 8,619,984 B2
(45) Date of Patent: Dec. 31, 2013

(54) DIFFERENTIAL PRIVACY PRESERVING RECOMMENDATION

(75) Inventors: Frank D. McSherry, San Francisco, CA (US); Ilya Mironov, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 682 days.

(21) Appl. No.: 12/557,538

(22) Filed: Sep. 11, 2009

(65) Prior Publication Data

US 2011/0064221 A1 Mar. 17, 2011

(51) Int. Cl.
*H04L 29/06* (2006.01)

(52) U.S. Cl.
USPC .......................................... 380/252; 713/189

(58) Field of Classification Search
USPC .......................................... 380/252; 713/189
See application file for complete search history.

(56) References Cited

U.S. PATENT DOCUMENTS

| | | | | |
|---|---|---|---|---|
| 6,853,982 | B2 | 2/2005 | Smith et al. | |
| 7,254,552 | B2 | 8/2007 | Bezos et al. | |
| 7,526,458 | B2 | 4/2009 | Flinn et al. | |
| 7,562,071 | B2 | 7/2009 | Dwork et al. | |
| 2002/0010625 | A1 * | 1/2002 | Smith et al. | 705/14 |
| 2004/0244029 | A1 * | 12/2004 | Gross | 725/9 |
| 2007/0130147 | A1 * | 6/2007 | Dwork et al. | 707/9 |
| 2007/0143289 | A1 | 6/2007 | Dwork et al. | |
| 2007/0156677 | A1 | 7/2007 | Szabo | |
| 2008/0209568 | A1 * | 8/2008 | Chang et al. | 726/26 |
| 2008/0243632 | A1 | 10/2008 | Kane et al. | |
| 2010/0042460 | A1 * | 2/2010 | Kane, Jr. | 705/9 |
| 2010/0138443 | A1 * | 6/2010 | Ramakrishnan et al. | 707/769 |

FOREIGN PATENT DOCUMENTS

| | | | |
|---|---|---|---|
| WO | WO03077112 | A1 | 9/2003 |

OTHER PUBLICATIONS

Dwork et al., Out Data, Ourselves: Privacy via Distributed Noise Generation, 2006, Retrieved from http://research.microsoft.com/en-us/people/mironov/odo.pdf, pp. 1-20.*

Baraglia, et al., "A privacy preserving web recommender system", retrieved at <<http://www.dsi.unive.it/~orlando/PAPERS/sac06suggest.pdf>>, Apr. 23-27, 2006, pp. 5

McSherry, Frank, et al., "Differentially Private Recommender Systems: Building Privacy into the Netflix Prize Contenders," retrieved at <<http://research.microsoft.com/pubs/80511/NetflixPrivacy.pdf, KDD '09, The 15th ACM SIGKDD International Conference on Knowledge Discovery and Data Mining, Paris, France, Jun. 28-Jul. 1, 2009, 9 pages.

(Continued)

*Primary Examiner* — Chau Le
(74) *Attorney, Agent, or Firm* — Microsoft Corporation

(57) ABSTRACT

User rating data may be received at a correlation engine through a network. The user rating data may include ratings generated by a plurality of users for a plurality of items. Correlation data may be generated from the received user rating data by the correlation engine. The correlation data may identify correlations between the items based on the user generated ratings. Noise may be generated by the correlation engine, and the generated noise may be added to the generated correlation data by the correlation engine to provide differential privacy protection to the user rating data.

19 Claims, 6 Drawing Sheets

200

(56) References Cited

OTHER PUBLICATIONS

Aïmeur, Esma, et al., "ALAMBIC: A Privacy-Preserving Recommender System for Electronic Commerce," retrieved at <<http://www.professeurs.polymtl.ca/jose.fernandez/AlambicIJIS.pdf>>, International Journal of Information Security, vol. 7, No. 5, Sep. 2008, pp. 307-334.

Cissée, Richard, et al., "An Agent-Based Approach for Privacy-Preserving Recommender Systems," retrieved at <<http://www.dai-labor.de/fileadmin/files/publications/AAMAS_2007_DRAFT.pdf>>, AAMAS '07 Proceedings of the 6th international joint conference on Autonomous agents and multiagent systems, Honolulu, HI, USA, Article No. 182, May 14-18, 2007, ACM New York, NY, USA, 9 pages.

Polat, Huseyin, et al., "Privacy-Preserving Collaborative Filtering Using Randomized Perturbation Techniques," retrieved at <<http://citeseerx.ist.psu.edu/viewdoc/download?doi=10.1.1.3.6378&rep=rep1&type=pdf>>, Electrical Engineering and Computer Science, Paper 18, http://surface.syr.eecs/18, 2003, 16 pages.

* cited by examiner

DIFFERENTIAL PRIVACY PRESERVING RECOMMENDATION

BACKGROUND

Recommendation systems based on collaborative filtering are a popular and useful way to recommend items and things (e.g., movies, music, products, restaurants, services, websites, etc.) to users. Typically, a user is recommended one or more items based on the items that the user has used and/or rated in view of the items that have been used and/or rated by other users. For example, a user may have provided ratings for a set of movies that the user has viewed. The user may then be recommended other movies to view based on the movies rated by other users who have provided at least some similar ratings of the movies rated by the user. Other examples of collaborative filtering systems may be systems that recommend websites to a user based on the websites that the user has visited, systems that recommend items for purchasing by a user based on items that the user has purchased, and systems that recommend restaurants to a user based on ratings of restaurants that the user has submitted.

While collaborative filtering is useful for making recommendations, there are also privacy concerns associated with collaborative filtering. For example, a user of an online store may not object to the use of their ordering history or ratings to make anonymous recommendations to other users and to themselves, but the user may not want other users to know the particular items that the user purchased or rated.

Previous solutions to this problem have focused on protecting the data that includes the user ratings. For example, user purchase histories may be kept in a secure encrypted database to keep malicious users from obtaining the user purchase histories. However, these systems may be ineffective at protecting the differential privacy of its users. A system is said to provide differential privacy if the presence or absence of a particular record or value cannot be determined based on an output of the system. For example, in the case of a website that allows users to rate movies, a curious user may attempt to make inferences about the movies a particular user has rated by creating multiple accounts, repeatedly changing the movie ratings submitted, and observing the changes to the movies that are recommended by the system. Such a system may not provide differential privacy because the presence or absence of a rating by a user (i.e., a record) may be inferred from the movies that are recommended (i.e., output).

SUMMARY

Techniques for providing differential privacy to user generated rating data are provided. User rating data may be used to generate a covariance matrix that identifies correlations between item pairs based on ratings for the items generated by users. In order to provide differential privacy to the user rating data, the contribution of the users used to generate the covariance matrix may be inversely weighted by a function of the number of rating submitted by the users, and noise may be added. The magnitude of the weights and the noise selected to add to the covariance matrix may control the level of differential privacy provided. The correlation matrix may then be used to recommend items to users, or may be released to third parties for use in making item recommendations to users.

In an implementation, user rating data may be received at a correlation engine through a network. The user rating data may include ratings generated by a plurality of users for a plurality of items. Correlation data may be generated from the received user rating data by the correlation engine. The correlation data may identify correlations between the items based on the user generated ratings. Noise may be generated by the correlation engine, and the generated noise may be added to the generated correlation data by the correlation engine to provide differential privacy protection to the user rating data.

Implementations may include some of the following features. Items may be recommended to a user based on the generated correlation data. The correlation data may include a covariance matrix. The noise may be generated by the correlation engine by generating a matrix of noise values and the generated matrix of noise values may be added to the covariance matrix. The generated noise may be Laplacian noise or Gaussian noise.

Per-item global effects may be removed from the user rating data. Removing per-item global effects from the user rating data may include calculating an average rating for each item rated in the user rating data, adding noise to the calculated average rating for each item, and for each rating in the user rating data, subtracting the calculated average rating for the rated item from the rating.

Per-user global effects may be removed from the user rating data. Removing the per-user global effects from the user rating data may include determining an average rating given by each user from the user rating data, and subtracting the determined average rating from each rating associated with the user. A rating interval may be selected and each rating in the user rating data may be recentered to the selected rating interval.

In an implementation, user rating data may be received. The user rating data may include a plurality of ratings of items generated by a plurality of users. Per-item global effects may be removed from the user rating data. A covariance matrix may be generated from the user rating data. Noise may be added to the generated covariance matrix to provide differential privacy protection to the user rating data. The generated covariance matrix may be published.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
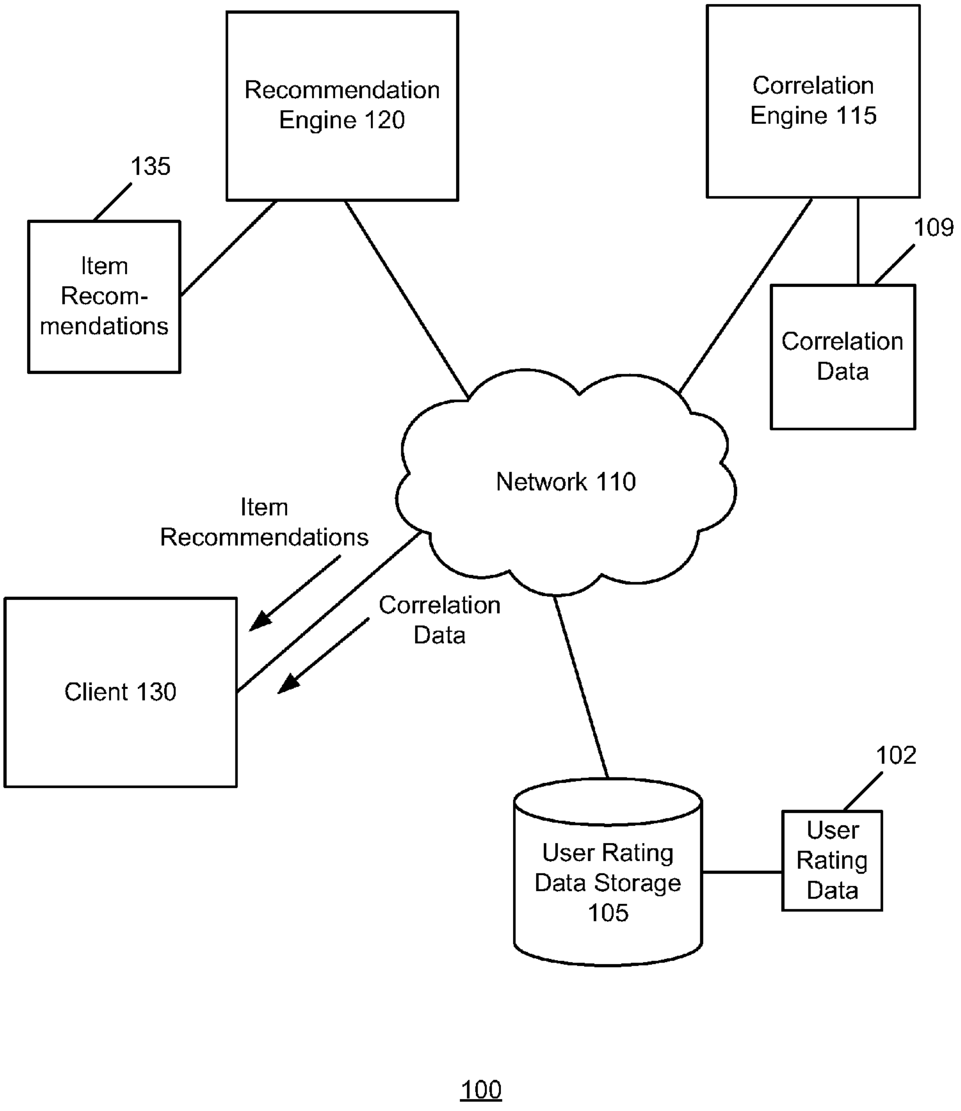
FIG. 1 is a block diagram of an implementation of a system that may be used to provide differential privacy for user rating data.

FIG. 1 is a block diagram of an implementation of a system 100 that may be used to provide differential privacy for user rating data 102. The user rating data 102 may include data describing a plurality of items and a plurality of user generated ratings of those items. The items may include objects, purchased items, websites, restaurants, books, services, places, etc. There is no limit to the types of items that may be included and that may be rated by the users. In some implementations, the ratings may be scores that are generated by the user and assigned to the particular items that are being rated. The ratings may be made in a variety of scales and formats. For example, in an implementation where users rate movies, the ratings may be a score between two numbers, such as 0 and 5. Other types of rating systems and rating scales may also be used.

In some implementations, the user rating data 102 may be stored in a user rating data storage 105 of the system 100. As illustrated, the user rating data storage 105 may be accessible to the various components of the system 100 through a network 110. The network 110 may be a variety of network types including the public switched telephone network (PSTN), a cellular telephone network, and a packet switched network (e.g., the Internet). The user rating data storage 105 protects the stored user rating data 102 from being viewed or accessed by unauthorized users. For example, the user rating data 102 may be stored in the user rating data storage 105 in an encrypted form. Other methods for protecting the user rating data 102 may also be used.

The system 100 may further include a correlation engine 115 that processes the user rating data 102 from the user rating data storage 105 to generate correlation data 109. This generated correlation data 109 may be used by a recommendation engine 120 to generate and provide item recommendations 135 to users based on the user's own ratings and/or item consumption history. The item recommendations 135 may be presented to a user at a client 130. The correlation engine 115, recommendation engine 120, and the client 130 may be implemented using one or more computing devices such as the computing device 600 illustrated in FIG. 6.

For example, in a system that allows users to rate books, the correlation engine 115 may generate correlation data 109 that describes correlations between the various users based on observed similarities in their submitted ratings from the user rating data 102. The recommendation engine 120 may use the correlation data 109 to generate item recommendations 135 for the user that may include recommended books that the user may be interested in based on the user's own ratings and the correlation data 109. Alternatively or additionally, the client 130 may use the correlation data 109 to generate the item recommendations 135.

In some implementations, the user rating data 102 may comprise a matrix of user rating data. The matrix may include a row for each user and a column corresponding to each rated item. Each row of the matrix may be considered a vector of item ratings generated by a user. Where a user has not provided a rating for an item, a null value or other indicator may be placed in the column position for that item, for example. Other data structures may also be used. For example, the user rating data 102 may comprise one or more tuples. Each tuple may identify a user, an item, and a rating. Thus, there may be a tuple in the user rating data 102 for each item rating. In implementations where the ratings are binary ratings, there may only be two entries in each tuple (e.g., user identifier and item identifier) because the absence of a tuple may indicate one of the possible binary rating values. Examples of such systems may be recommendations systems based on websites that the user has visited or items that the user has purchased.

In some implementations, the generated correlation data 109 may comprise a covariance matrix. A covariance matrix is a matrix having an entry for each rated item pair from the user rating data 102 whose entry is the average product of the ratings for those items across all users. Thus, an item pair with a large average product entry indicates a high correlation between the items in that users who rated one of the items highly also rated the other of the two items highly. Other types of data structures may be used for the correlation data 109 such as a data matrix or a gram matrix, for example.

The correlation engine 115 may generate the correlation data 109 in such a way as to preserve the differential privacy of the user rating data 102. Differential privacy is based on the principle that that the output of a computation or system should not allow any inferences about the presence or absence of a particular record or piece of data from the input to the computation of system. In other words, the correlation data 109 output by the correlation engine 115 (e.g., the covariance matrix) cannot be used to infer the presence or absence of a particular record or information from the user rating data 102.

The correlation engine 115 may generate the correlation data 109 while preserving the differential privacy (or approximate differential privacy) of the user rating data 102 by incorporating noise into the user data 102 at various stages of the calculation of the correlation data 109. The noise may be calculated using variety of well known noise calculation techniques including Gaussian noise and Laplacian noise, for example. Other types of noise and noise calculation techniques may be used. The amount of noise used may be based on the number of entries (e.g., users and item ratings) in the user rating data 102. The noise may be introduced at one or more stages of the correlation data 109 generation.

In addition to noise, the correlation engine 115 may preserve the differential privacy of the user rating data 102 by incorporating weights into the calculation of the correlation data 109. The weights may be inversely proportional to the number of ratings that each user has generated. By inversely weighing the ratings contribution of users using the number of ratings they have submitted, the differential privacy of the user rating data 102 is protected because the amount of rating contributed by any one user is obscured, for example.

The correlation engine 115 may calculate the correlation data 109 with differential privacy by removing what are referred to as global effects from the user rating data 102. The global effects may include per-item global effects and per-user global effects, for example; however, other types of global effects may also be removed by the correlation engine 115. For example, consider a system for rating books. A particular book may tend to be rated highly because of its genre, author, or other factors, and may tend to receive ratings that are skewed high or low, resulting in a per-item global effect. Similarly, for example, some users may give books they neither like nor dislike a rating of two out of five (on a scale of zero to five) and other users may give books they neither like nor dislike a rating of four out of five, and some users may give books they like a rating of four and other users may give books they like a rating of five, resulting in a per-user global effect. By removing both per-item and per-user global effects, the various ratings from the user rating data 102 may be more easily compared and used to identify correlations in the user rating data 102 between the various users and items because the user ratings will have a common mean, for example.

The correlation engine 115 may remove the per-item global effects from the user rating data 102 and introduce noise to the user rating data 102 to provide differential privacy. As part of removing the per-item global effects, the correlation engine 115 may calculate a global sum (i.e., GSum) and calculate a global count (i.e., GCnt) from the user rating data 102 using the following formulas:

$$GSum = \sum_{u,i} r_{ui} + \text{Noise},$$

$$GCnt = \sum_{u,i} e_{ui} + \text{Noise}.$$

The variable $r_{ui}$ may represent a rating by a user u for an item i. The variable $e_{ui}$ may represent the presence of an actual rating for the item i from a user u in the user rating data 102, to distinguish from a scenario where the user u has not actually rated a particular item i. As described above, the noise added to the calculations may be Gaussian noise or Laplacian noise in an implementation. The variables GSum and Gcnt may then be used by the correlation engine 115 to calculate a global average rating G that may be equal to GSum divided by Gcnt. The global average rating G may represent the average rating for all rated items from the user rating data 102, for example.

The correlation engine 115 may further calculate a per-item average rating for each rated item i in the user rating data 102. The correlation engine 115 may first calculate a sum of the ratings for each item (i.e., $MSum_i$) and a count of the number of ratings for each item (i.e., $MCnt_i$) similarly to how the GSum and GCnt were calculated above. In addition, noise may be added to each vector of user ratings during the computation as illustrated below by the variable $Noise^d$. $Noise^d$ may be a vector of randomly generated noise values of size d, where d may be the number of distinct items to be rated, for example. $MSum_i$ and $MCnt_i$ may be calculated using the following formulas:

$$MSum_i = \sum_{u,i} r_{ui} + Noise^d,$$

$$MCnt_i = \sum_{u,i} e_{ui} + Noise^d.$$

In some implementations, a stabilized per-item average may also be calculated using the calculated $MSum_i$ for each item i and some number of fictitious ratings ($\beta_m$) set to the calculated per-item average G. By stabilizing the per-item average rating, the effects of a single low rating or high rating for an item with few ratings may be reduced. The degree of stabilization may be represented by the variable $\beta_m$. A large value of $\beta_m$ may represent a high degree of stabilization and a small value of $\beta_m$ may represent a low degree of stabilization.

The particular value of $\beta_m$ may be selected by a user or administrator based on a variety of factors including but not limited to the average number of ratings per item and the total number of items rated, for example. Too high a value of $\beta_m$ may overly dilute the ratings, while too low a value of $\beta_m$ may allow the average rating for an infrequently rated item to be overly affected by a single very good or bad rating. In some implementations, the value of $\beta_m$ may be between 20 and 50, for example.

The correlation engine 115 may calculate a stabilized average rating for each item i using the following formula:

$$MAvg_i = \frac{MSum_i + \beta_m G}{MCnt_i + \beta_m}.$$

Using the calculated value of $MAvg_i$, the correlation engine 115 may account for the per-item global effects of an item i by subtracting the calculated $MAvg_i$ from each rating in the user rating data 102 of the item i. For example, in a system for rating movies, if the rating for a particular movie was 5.0, and the computed $MAvg_i$ for that movie is 4.2, then the new adjusted rating for that movie may be 0.8.

In some implementations, the calculated average ratings may be published as part of the correlation data 109 by the correlation engine 115, for example. Because of the addition of noise to the calculation of the averages, the differential privacy of the user rating data 102 used to generate the average ratings may be protected.

The correlation engine 115 may further remove the per-user global effects from the user rating data 102. As described above, some users have different rating styles and the user rating data 102 may benefit from removing per-user global effects from the data. For example, one user may almost never provide ratings above 4.0, while another user may frequently provide ratings between 4.0 and 5.0.

In some implementations, the correlation engine 115 may begin to remove the per-user global effects by computing an average rating for given by each user (i.e., $\bar{r}_u$) using the formula:

$$\bar{r}_u = \frac{\sum_i (r_{ui} - Mavg_i) + \beta_p H}{c_u + \beta_p},$$

where H is a global average that may be computed analogously to the global average rating G described above, over ratings with item (e.g., movie) effects taken into account.

As illustrated above, the average rating for a user u may be computed by the correlation engine 115 as the sum of each user's ratings adjusted by the average rating for each item (i.e., $MAvg_i$) divided by the total number of ratings actually submitted by the user (i.e., $c_u$). In addition, each user's average rating may be stabilized by adding some number of fictitious ratings ($\beta_p$). Stabilizing the average rating for a user may help prevent a user's average rating from being skewed due to a low number of ratings associated with the user. For example, a new user may have only rated one item from the user rating data 102. Because the user has only rated one item, the average rating may not be a good predictor of the user's rating style. For purposes of preserving the privacy of the users, the average user ratings may not be published by the correlation engine 115, for example.

In some implementations, as part of removing the per-user global effects, the correlation engine 115 may further process the user rating data 102 by recentering the user generated ratings to a new interval. The new interval may be recentered by mapping the ratings of items to values between the interval [−B, B], where B is a real number. The value chosen for B may be chosen by a user or administrator based on a variety of factors. For example, a small value of B may result in a smaller range for [−B, B] that discounts the effects of very high or very low ratings, but may make the generated correlation data 109 less sensitive to small differences in rating values. In contrast, a larger value of B may increase the effects of high ratings and may make the generated correlation data 109 more sensitive to differences in rating values.

In some implementations, the ratings from the user rating data 102 may be recentered by the correlation engine 115 according to the following formula where $\hat{r}_{ui}$ represents a recentered rating of an item i from a user u:

$$\hat{r}_{ui} = -B, \text{ if } r_{ui} - \bar{r}_u < -B,$$

$$r_{ui} - \bar{r}_u, \text{ if } -B \le r_{ui} - \bar{r}_u < B,$$

$$B, \text{ if } B \le r_{ui} - \bar{r}_u$$

The correlation engine 115 may use the recentered, global per-user and per-item effect adjusted, recentered user rating data 102 to generate the correlation data 109. In some implementations, the correlation data 109 may in the form of a covariance matrix. However, other data structures may also be used.

The covariance matrix may be generated from the user rating data 102 using the following formula that takes into account both a weight associated with the user as well as added noise:

$$Cov_{ij} = \sum_u w_u \hat{r}_u \hat{r}_u^T + Noise^{d \times d}.$$

As described above, in some implementations, the user rating data 102 may include a vector for each user that contains all of the ratings generated by that user. Accordingly, the correlation engine 115 may generate the covariance matrix from the user rating data 102 by taking the sum of each recentered vector of ratings for a user u (i.e., $\hat{r}_u$) multiplied by the transpose of each recentered vector (i.e., $\hat{r}_u^T$). In addition, to provide for differential privacy assurances, a matrix of noise may be added to the covariance matrix. The matrix of noise may be sized according to the number of unique items rated in the user rating data 102 (i.e., d). The noise may be generated using a variety of well known techniques including Gaussian noise and Laplacian noise, for example.

The particular type of noise selected to generate the covariance matrix may lead to different levels of differential privacy assurances. For example, the use of Laplacian noise may result in a higher level of differential privacy at the expense of the accuracy of subsequent recommendations using the correlation data 109. Conversely, the use of Gaussian noise may provide weaker differential privacy but result in more accurate recommendations.

As illustrated in the above formula, the entries in the covariance matrix may be multiplied by weights to provide additional differential privacy assurances. The product of the ratings of each item pair may be multiplied by a weight associated with a user u (i.e., $w_u$). The weight may be inversely based on the number of ratings associated with the user (i.e., $e_u$). For example, $w_u$ may be set equal to the reciprocal of $e_u$ (i.e., $1/e_u$). Other calculations may be used for $w_u$ including $1/\sqrt{e_u}$ and $1/(e_u)^2$.

Similarly as described above for the calculation of noise, the particular combination of noise and weights used by the correlation engine 115 to calculate the correlation data 109 may affect the differential privacy assurances that may be made. For example, using $1/\sqrt{e_u}$ for $w_u$ and Gaussian noise may provide per-user, approximate differential privacy, using $1/e_u$ for $w_u$ and Laplacian noise may provide per-entry, differential privacy, using $1/e_u$ for $w_u$ and Gaussian noise may provide per-entry, approximate differential privacy, and using $1/(e_u)^{2\ for\ w}{}_u$ and Laplacian noise may provide per-user, differential privacy. A per-entry differential privacy assurance guarantees that the absence of a particular rating in the user rating data 102 cannot be inferred from the covariance matrix. In contrast, a per-user differential privacy assurance guarantees that the presence or absence of a user and their associated ratings cannot be inferred from the covariance matrix.

In some implementations, the correlation engine 115 may further clean the correlation data 109 before providing the correlation data 109 to the recommendation engine 120 and/or the client 130. Where the correlation data 109 is a covariance matrix, the covariance matrix may be first modified by the correlation engine 115 by replacing each of the calculated covariances (i.e., $Cov_{ij}$) in the covariance matrix with a covariance calculation that is stabilized (i.e., $\overline{Cov}_{ij}$) by adding a number of calculated average covariance values (i.e., avgCov) to the stabilization calculation. This calculation is similar to how the stabilized value of the average item rating (i.e., Mavg) was calculated above.

The covariance values (i.e., $Cov_{ij}$) in the covariance matrix may then be replaced by the correlation engine 115 with the stabilized covariance values (i.e., $\overline{Cov}_{ij}$) according to the following formulas:

$$Cov_{ij} = \sum_u w_u \hat{r}_u \hat{r}_u^T + Noise^{d \times d},$$

$$Wgt_{ij} = \sum_u w_u e_u e_u^T + Noise^{d \times d},$$

$$\overline{Cov}_{ij} = \frac{Cov_{ij} + \beta \times avgCov}{Wgt_{ij} + \beta \times avgWgt}.$$

In some implementations, the correlation engine 115 may further clean the covariance matrix by computing a rank-k approximation of the covariance matrix. The rank-k approximation of the covariance matrix can be applied to the covariance matrix to remove some or all of the error that was introduced to the covariance matrix by the addition of noise by the correlation engine 115 during the various operations of the correlation data 109 generation. In addition, the application of the rank-k approximations may remove the error without substantially affecting the reliability of the correlations described by the covariance matrix. The rank-k approximations may be generated using any of a number of known techniques for generating rank-k approximations from a covariance matrix.

In some implementations, before applying the rank-k approximation to the covariance matrix, the correlation engine 115 may unify the variances of the noise that has been applied to the covariance matrix so far. Covariance matrix entries that were generated from users with fewer contributed ratings may have higher variances in their added noise than entries generated from users with larger amounts of contributed ratings. This may be because of the smaller value of $Wgt_{ij}$ for the entries generated from users with fewer contributed ratings, for example.

To account for the differences in variance, the variance of each entry in the covariance matrix may be scaled upward by a factor of $(\sqrt{(MCnt_i \times MCnt_j)})$ by the correlation engine 115. The correlation engine 115 may then apply the rank-k approximation to the scaled covariance matrix. The variance of each entry may be scaled downward by the same factor by the correlation engine 115.

The correlation engine 115 may provide the generated correlation data 109 (e.g., the covariance matrix) to the recommendation engine 120. The recommendation engine 120 may use the provided correlation data 109 to generate item recommendations 135 of one or more items to users based on item ratings generated by the users in view of the generated correlation data 109. The item recommendations 135 may be provided to the user at the client 130, for example.

The recommendation engine 120 may generate the item recommendations 135 using a variety of well known methods and techniques for recommending items based on a covariance matrix and one or more user ratings. In some implementations, the recommendations may be made using one or more well known geometric recommendation techniques. Example techniques include k-nearest neighbor and singular value decomposition-based ("SVD-based") prediction mechanisms. Other techniques may also be used.

In some implementations, the correlation data 109 may be provided to a user at the client 130 and the users may generate item recommendations 135 at the client 130 using the correlation data 109. The item recommendations 135 may be generated using similar techniques as described above with respect to the recommendation engine 120. By allowing a user to generate their own item recommendations locally at the client 130, the user may be assured that the user's own item ratings remain private and are not published or transmitted to the recommendation engine 120 for purposes of generating item recommendations 135. In addition, such a configuration may allow a user to receive item recommendations 135 when the client 130 is disconnected from the network 110, for example.

Figure 2:
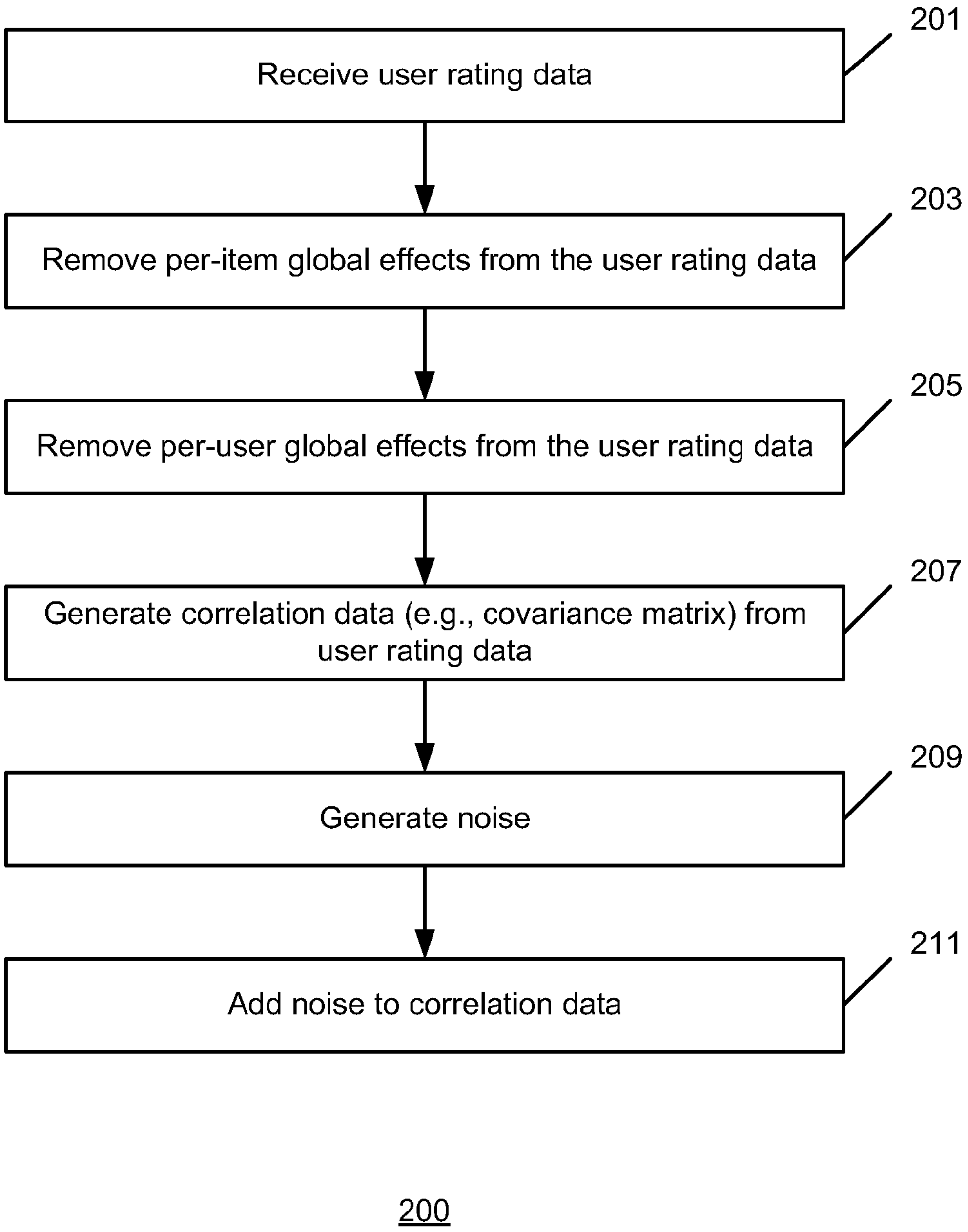
FIG. 2 is an operational flow of an implementation of a method for generating correlation data from user rating data while providing differential privacy.

FIG. 2 is an operational flow of an implementation of a method 200 for generating correlation data from user rating data while providing differential privacy. The method 200 may be implemented by the correlation engine 115, for example.

User rating data may be received (201). The user rating data may be received by the correlation engine 115 through the network 110, for example. In some implementations, the user rating data includes vectors, with each vector associated with a user and including ratings generated by the user for a plurality of items. For example, in a system for rating movies, the user rating data may include a vector for each user along with ratings generated by the user for one or more movies. The rated items are not limited to movies and may include a variety of items including consumer goods, services, websites, restaurants, etc.

Per-item global effects may be removed from the user rating data (203). The per-item global effects may be removed by the correlation engine 115, for example. In some implementations, the per-item global effects may be removed by computing the average rating for each item, and for each item rating, subtracting the computed average rating for the item. In addition, noise may be added to the calculation of the average rating to provide differential privacy. The noise may be calculated using a variety of noise calculation techniques including Gaussian and Laplacian techniques.

Per-user global effects may be removed from the user rating data (205). The per-user global effects may be removed by the correlation engine 115, for example. In some implementations, the per-user global effects may be removed by computing the average rating for all ratings given by a user, and for each rating given by the user, subtracting the average rating for the user.

Correlation data may be generated from the user rating data (207). The correlation data may be generated by the correlation engine 115, for example. The correlation data may quantify correlations between item pairs from the user rating data. In some implementations, the correlation data may be a covariance matrix. However, other data structures may also be used.

In some implementations, where the correlation data is a covariance matrix, each entry in the covariance matrix may be multiplied by a weight based on the number of ratings provided by the user or users associated with the covariance matrix entry. As described above, each entry in the covariance matrix may be the sum of the products of ratings for an item pair across all users. Each product in the sum may be multiplied by a weight associated with the user who generated the ratings. The weight may be inversely related to the number of ratings associated with the user. For example, the weight may be $1/e_u$, $1/e_u$, or $1/(e_u)^2$ where $e_u$ represents the number of ratings made by a user u. Weighting the entries in the covariance matrix may help obscure the number of ratings that are contributed by each user thus providing additional differential privacy to the underlying user rating data, for example.

Noise may be generated (209). The noise may be generated by the correlation engine 115, for example. In implementations where the correlation data is a covariance matrix, the generated noise may be a matrix of noise that is the same dimension as the covariance matrix. The noise values in the noise matrix may be randomly generated using Gaussian or Laplacian techniques, for example.

Generated noise may be added to the correlation data (211). The generated noise may be added to the correlation data by the correlation engine 115, for example. In implementations where the correlation data is a covariance matrix, the noise matrix may be added to the covariance matrix using matrix addition. By adding the generated noise to the correlation data, the differential privacy of the users who contributed the user rating data may be further protected, and the correlation data may be published or otherwise made available without differential privacy concerns.

Figure 3:
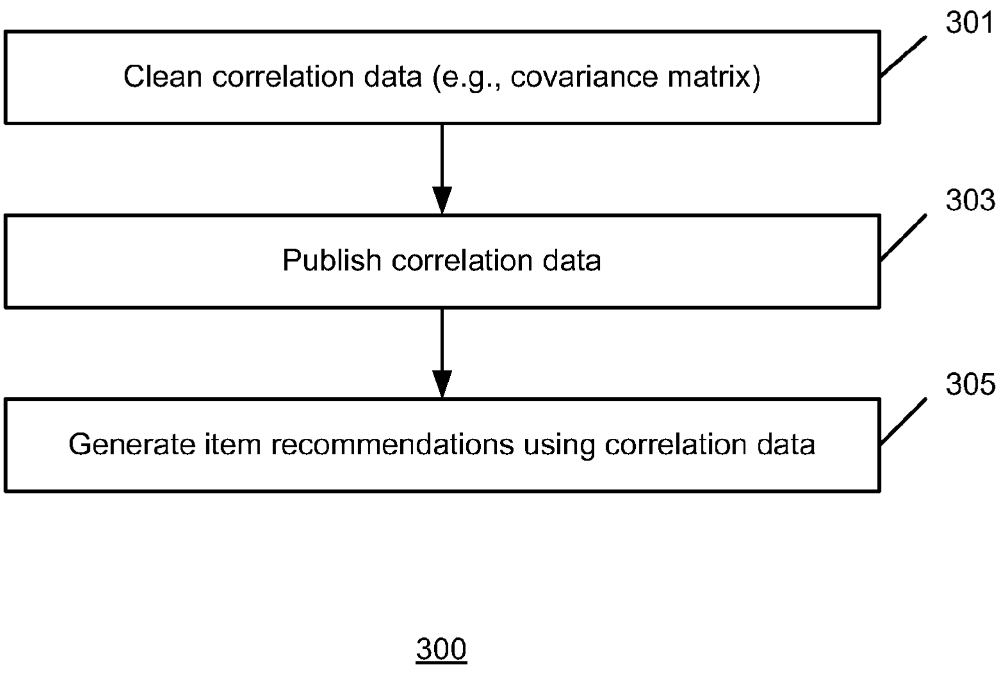
FIG. 3 is an operational flow of an implementation of a method for generating item recommendations from correlation data while providing differential privacy.

FIG. 3 is an operational flow of an implementation of a method 300 for generating item recommendations from correlation data while preserving differential privacy. The method 300 may be implemented by the correlation engine 115 and the recommendation engine 120, for example.

The correlation data (e.g., generated by the method 200 of FIG. 2) may be cleaned (301). The correlation data may be cleaned by the correlation engine 115, for example. Cleaning the correlation data hay help remove some of the error that may have been introduced by adding noise and weights to the correlation data. In implementations where the correlation data is a covariance matrix, the covariance matrix may be cleaned by applying a rank-k approximation to the covariance matrix. In addition, each entry in the covariance matrix may be scaled up by a factor of the product of the number of ratings for the rated item pair associated with the entry (e.g., $\sqrt{(MCnt_i \times MCnt_j)}$). The rank-k approximation may then be applied and each entry in the covariance matrix may be scaled down by the same factor, for example.

The correlation data may be published (303). The correlation data may be published by the correlation engine 115 through the network 110 to the recommendation engine 120 or a client device 130, for example.

Item recommendations may be generated using the correlation data (305). The item recommendations may be generated by the recommendation engine 120 or a client 130, for example. In some implementations, the item recommendations may be generated using geometric methods including k-nearest neighbor and SVD-based prediction. However, other methods and techniques may also be used.

Figure 4:
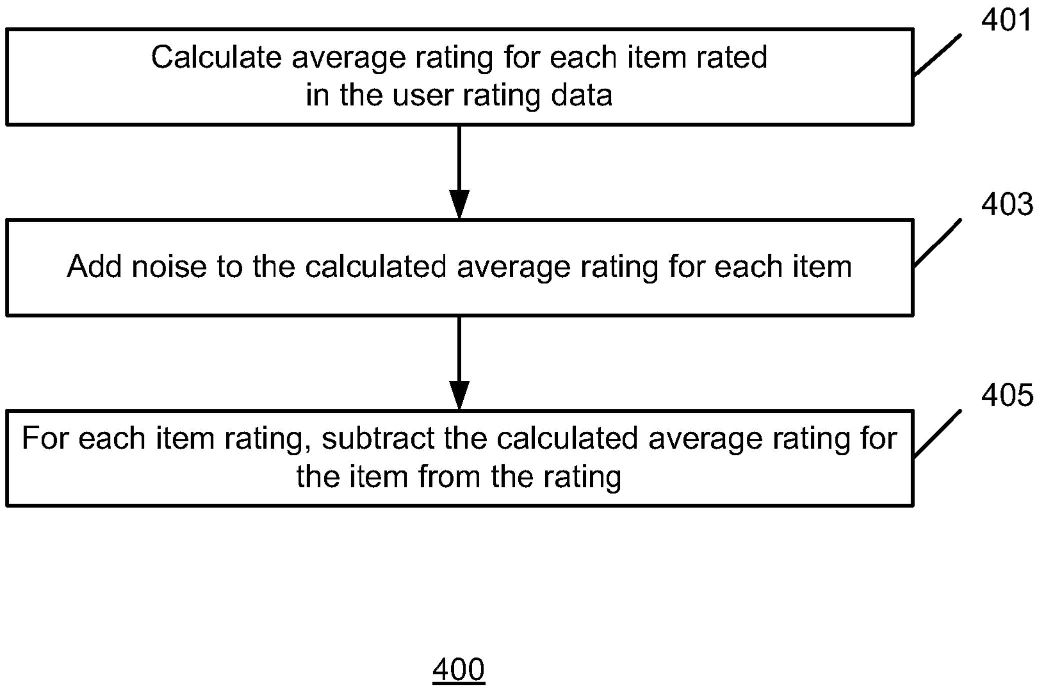
FIG. 4 is an operational flow of an implementation of a method for removing per-item global effects from the user rating data.

FIG. 4 is an operational flow of an implementation of a method 400 for removing per-item global effects from the user rating data. The method 400 may be implemented by the correlation engine 115, for example.

The average rating for each rated item in the user rating data may be calculated (401), for example. The average rating for each item may be calculated by the correlation engine 115. In some implementations, the calculated average rating may be stabilized by adding some number of fictitious ratings to the average rating calculation. The fictitious ratings may be set to a global average rating calculated for the all the items in the user rating data, for example. Stabilizing the average rating may be useful for items with a small number of ratings to prevent a strongly negative or positive rating from overly skewing the average rating for that item.

Noise may be added to the calculated average rating for each item (403). The noise may be added to the calculated average rating by the correlation engine 115. The added noise may be Laplacian or Gaussian noise, for example.

For each item rating, the calculated average rating for that item may be subtracted from the rating (405). The calculated average may be subtracted by the correlation engine 115, for example. Subtracting the average rating for an item from each rating of that item may help remove per-item global effects or biases from the item ratings.

Figure 5:
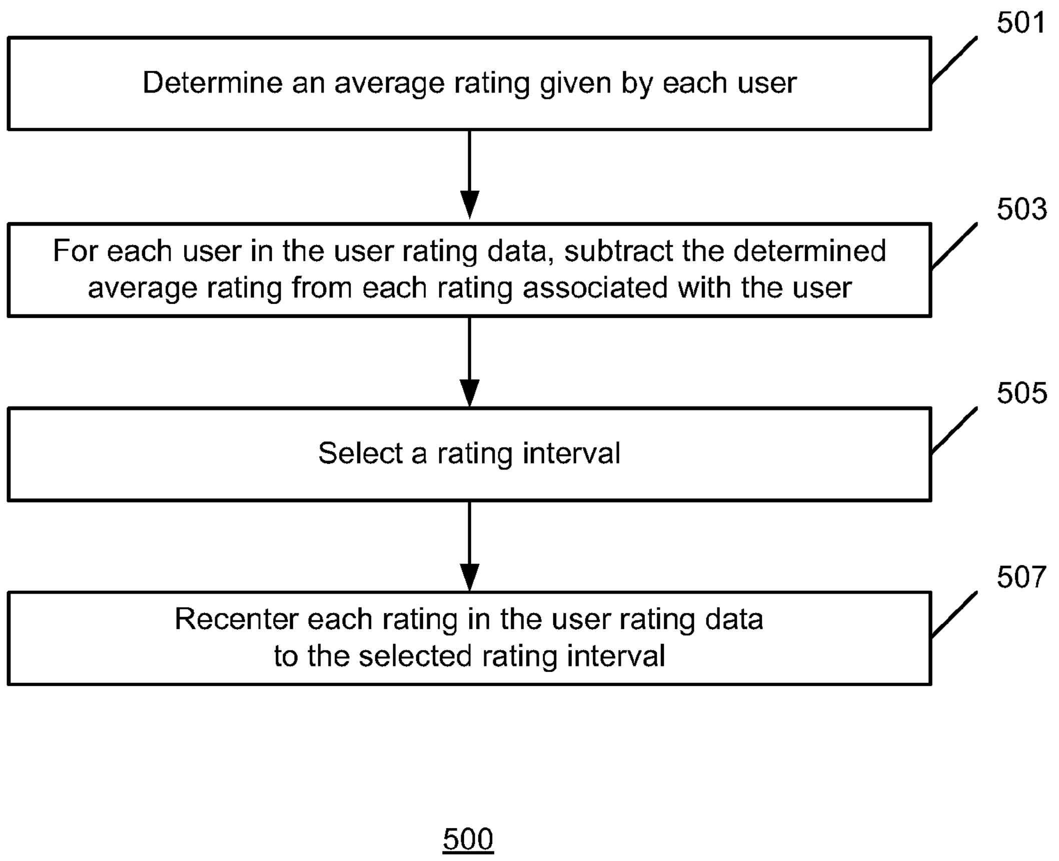
FIG. 5 is an operational flow of an implementation of a method for removing per-user global effects from user rating data.

FIG. 5 is an operational flow of an implementation of a method 500 for removing per-user global effects from user rating data. The per-user global effects may be removed by the correlation engine 115, for example.

The average rating given by each user may be determined (501). The average ratings may be determined by the correlation engine 115. The average user rating may be determined by taking the sum of each rating made by a user in the user rating data and dividing it by the total number of ratings made by the user. Similarly as described in FIG. 4, the average user rating may be stabilized by calculating the average with some number of fictitious ratings. The fictitious ratings may be set equal to the average rating for all ratings in the user rating data. Stabilizing the average rating calculation may help generate a more reliable average rating for users who may have only rated a small number of items and whose rating style may not be well reflected by the items rated thus far.

For each user in the user rating data, the determined average rating may be subtracted from each rating associated with the user (503). The determined average rating may be subtracted by the correlation engine 115, for example.

A rating interval may be selected (505). The rating interval may be selected by the correlation engine 115, for example. While not strictly necessary for removing per-user global effects, it may be useful to recenter the item ratings to a new scale or interval. For example, item ratings on a scale of 1 to 4 may be recentered to a scale of −1 to 1. By increasing or decreasing the interval, the significance of very high and very low ratings can be further diminished or increased as desired.

Each rating in the user rating data may be recentered to the selected rating interval (507). The ratings may be recentered by the correlation engine 115, for example. In some implementations, the recentering may be performed by linearly mapping the scale used for the item ratings to the selected interval. Other methods or techniques may also be used to map the recentered ratings to the new interval.

Figure 6:
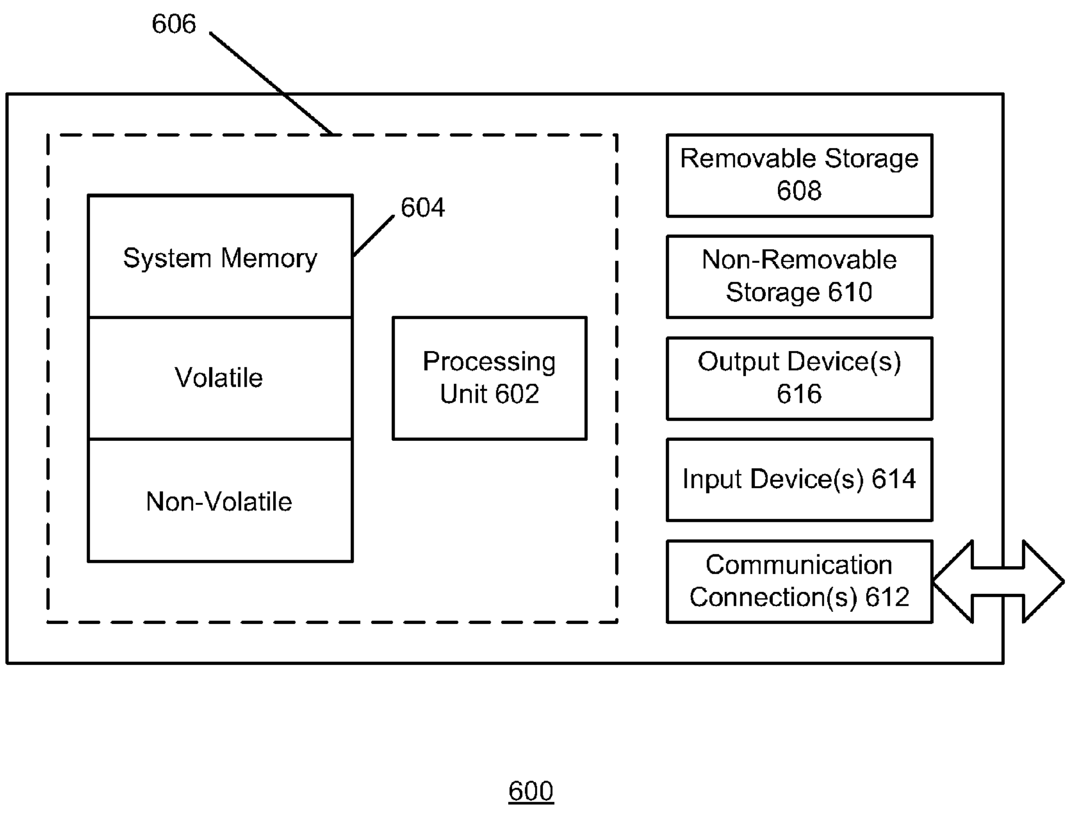
FIG. 6 shows an exemplary computing environment.

FIG. 6 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features and/or functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for providing differential privacy comprising:

receiving user rating data at a correlation engine through a network, the user rating data comprising ratings generated by a plurality of users for a plurality of items;

removing per-item global effects from the user rating data by:

calculating an average rating for each item rated in the user rating data;

determining a plurality of fictitious ratings for each item rated in the user rating data, wherein each fictitious rating of an item is set to the calculated average rating of the item;

calculating a stabilized average rating for each item rated in the user rating data using the ratings in the user rating data for the item and the plurality of fictitious ratings for the item; and for each rating in the user rating data, subtracting the calculated stabilized average rating for the rated item from the rating;

generating correlation data from the user rating data by the correlation engine, the correlation data identifying correlations between the items based on the user generated ratings;

generating noise by the correlation engine; and adding the generated noise to the generated correlation data by the correlation engine to provide differential privacy protection to the generated correlation data.

2. The method of claim 1, further comprising recommending an item to a user based on the generated correlation data.

3. The method of claim 1, wherein the correlation data comprises a covariance matrix.

4. The method of claim 3, wherein the covariance matrix comprises an entry for each unique item pair from the user rating data, and the each entry comprises the sum of the products of the ratings for the associated item pair for each user and each product is inversely weighted by a function of the number of ratings generated by the user.

5. The method of claim 3, wherein generating the noise by the correlation engine comprises:

generating a matrix of noise values, wherein the matrix of noise values is the same size as the covariance matrix; and adding the generated matrix of noise values to the covariance matrix.

6. The method of claim 1, wherein removing per-item global effects from the user rating data further comprises:

adding noise to the calculated average rating for each item.

7. The method of claim 1, further comprising removing per-user global effects from the user rating data.

8. The method of claim 7, wherein removing the per-user global effects from the user rating data comprises:

determining an average rating given by each user from the user rating data; and for each user in the user rating data, subtracting the determined average rating from each rating associated with the user.

9. The method of claim 8, further comprising:

selecting a rating interval; and recentering each rating in the user rating data to the selected rating interval.

10. A system for providing differential privacy comprising:

a computing device;

a correlation engine adapted to:

receive user rating data, wherein the user rating data comprises a plurality of item ratings generated by a plurality of users;

remove per-item global effects from the user rating data by:

calculating an average rating for each item rated in the user rating data;

determining a plurality of fictitious ratings for each item rated in the user rating data, wherein each fictitious rating of an item is set to the calculated average rating of the item;

calculating a stabilized average rating for each item rated in the user rating data using the ratings in the user rating data for the item and the plurality of fictitious ratings for the item; and for each rating in the user rating data, subtracting the calculated stabilized average rating for the rated item from the rating;

generate a covariance matrix from the user rating data;

add noise to the generated covariance matrix to provide differential privacy protection to the covariance matrix; and publish the generated covariance matrix; and a recommendation engine adapted to:

receive the generated covariance matrix; and generate item recommendations using the published covariance matrix.

11. The system of claim 10, wherein the generated noise is Laplacian noise or Gaussian noise.

12. The system of claim 10, wherein the correlation engine is further adapted to clean the generated covariance matrix.

13. The system of claim 10, wherein the correlation engine is further adapted to remove per-user global effects from the user rating data.

14. The system of claim 10, wherein the correlation engine adapted to remove per-item global effects further comprises the correlation engine adapted to:

add noise to the calculated average rating for each item.

15. The system of claim 14, wherein the correlation engine is further adapted to publish the calculated average rating for each item.

16. A method for providing differential privacy comprising:

receiving user rating data by a correlation engine through a network, wherein the user rating data comprises a plurality of ratings of items generated by a plurality of users;

removing per-item global effects from the user rating data by the correlation engine by:

calculating an average rating for each item rated in the user rating data;

determining a plurality of fictitious ratings for each item rated in the user rating data, wherein each fictitious rating of an item is set to the calculated average rating of the item;

calculating a stabilized average rating for each item rated in the user rating data using the ratings in the user rating data for the item and the plurality of fictitious ratings for the item; and for each rating in the user rating data, subtracting the calculated stabilized average rating for the rated item from the rating;

generating a covariance matrix from the user rating data by the correlation engine;

adding noise to the generated covariance matrix to provide differential privacy protection to the user rating data by the correlation engine; and publishing the generated covariance matrix by the correlation engine.

17. The method of claim 16, further comprising removing per-user global effects from the user rating data.

18. The method of claim 16, further comprising generating item recommendations using the covariance matrix.

19. The method of claim 16, wherein the noise is Laplacian noise or Gaussian noise.

* * * * *